(12) United States Patent
Schweitzer et al.

(10) Patent No.: US 6,700,030 B2
(45) Date of Patent: Mar. 2, 2004

(54) METHOD FOR CONVERTING HYDROCARBONS IN A THREE-PHASE REACTOR

(75) Inventors: Jean-Marc Schweitzer, Serpaire (FR); Pierre Galtier, Vienne (FR); Francois Hugues, Charly (FR); Cristina Maretto, Padua (IT)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 10/239,400

(22) PCT Filed: Feb. 28, 2001

(86) PCT No.: PCT/FR01/00596
§ 371 (c)(1),
(2), (4) Date: Sep. 26, 2002

(87) PCT Pub. No.: WO01/72408
PCT Pub. Date: Oct. 4, 2001

(65) Prior Publication Data
US 2003/0105371 A1 Jun. 5, 2003

(30) Foreign Application Priority Data
Mar. 27, 2000 (FR) .......................................... 00 03924

(51) Int. Cl.$^7$ .............................. C07C 1/00; C07C 2/00; C07C 5/00; C07C 4/00
(52) U.S. Cl. ........................ 585/921; 585/925; 585/446; 585/250; 585/440; 585/654; 585/639; 585/648; 585/407; 585/638; 585/502; 585/510; 208/209
(58) Field of Search ................................ 585/921, 925, 585/250, 440, 654, 639, 648, 407, 638, 502, 510, 446; 208/209

(56) References Cited

U.S. PATENT DOCUMENTS 4,316,793 A 2/1982 Sze

FOREIGN PATENT DOCUMENTS

| EP | 0396384 A2 | 11/1990 |
|---|---|---|
| EP | 0540793 A1 | 5/1993 |

*Primary Examiner*—Thuan D. Dang
(74) *Attorney, Agent, or Firm*—Millen, White, Zelano & Branigan, P.C.

(57) ABSTRACT

A process for converting hydrocarbons in the presence of a catalyst is described that is carried out in a three-phase reactor in which the liquid Peclet number is in the range 0 (excluded) to about 10, with a superficial gas velocity $U_g$ that is preferably less than 35 cm.s$^{-1}$, to encourage gas transfer into the liquid phase and avoid too much attrition of the catalyst grains.

15 Claims, 2 Drawing Sheets

METHOD FOR CONVERTING HYDROCARBONS IN A THREE-PHASE REACTOR

Figure 1:
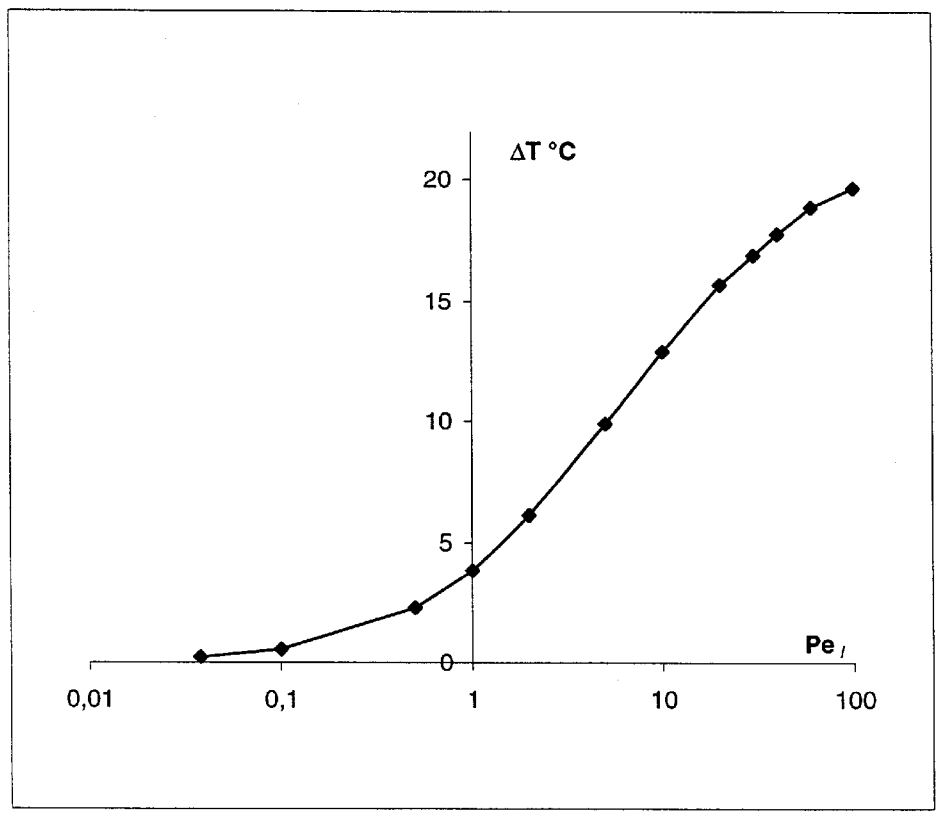

The present invention relates to a process for converting hydrocarbons, for example in refining or petrochemistry, or the fine chemicals industry, in the presence of a catalyst, carried out in a three-phase reactor and in which the liquid Peclet number ($Pe_l$) is in the range 0 (excluded) to about 10.

More particularly, the present invention relates to chemical conversion processes with relatively high exothermicity or endothermicity, which thus require thermal reaction control.

More particularly, the present invention is applicable to exothermic reactions producing a high temperature, for example above 100°C. and usually above 130°C., generally at an absolute pressure of more than 0.1 megapascals (MPa) and usually more than 0.5 MPa.

PRIOR ART

Reactions with marked exothermicity or endothermicity that can be cited include dehydrogenation, hydrogenation, transhydrogenation, the decomposition of ethers to olefins, the hydrogenolysis of hydrocarbons or esters, aromatisation, hydrodenitrogenation, hydrotreatment, in particular residue hydrotreatment, hydroformylation, alcohol synthesis, polyolefin synthesis, isomerisation, oligomerisation, in particular dimerisation (such as the Applicant's dimersol processes), oxidation, hydrodesulphurisation and aliphatic or aromatic alkylation. Some of these reactions have been described, for example, in J. F. LePage's book published by Technip in 1987 entitled "Applied Heterogeneous Catalysis" and in "Ullmann's Encyclopaedia of Industrial Chemistry" (volume B4, $5^{th}$ Edition, pages 105–106) cited by way of reference, the descriptions of which are hereby considered to be included in the present description by dint of this reference which are hereby considered to be included in the present description by dint of this reference thereto.

Several types of chemical conversion reactors can be used, the solid being used either in an entrained bed or in a bubble column reactor or slurry bubble column where gas comes into contact with a liquid/very finely divided solid mixture (slurry). The term "slurry" will be used in the present description to designate a suspension of solid particles in a liquid. The heat of reaction is normally eliminated by a cooling exchanger generally inside the reactor.

Within the context of the present invention, the reactor used is preferably a slurry bubble column. Slurry bubble columns comprise a liquid medium containing solid particles in suspension, generally mainly catalytic particles, comprising at least one means for introducing at least one gas phase comprising at least one reactant, by means of at least one distribution means that produces gas bubbles normally with a relatively small diameter. The gas bubbles rise in the column and at least one reactant is absorbed by the liquid and diffuses towards the solid. When the solid is a catalyst, the reactants are converted on contact into gaseous and/or liquid and/or solid products depending on the conversion conditions and catalyst type.

The gaseous products which may comprise at least one unconverted gaseous product and gaseous products that may be formed during the reaction, are collected near the head of the column. The suspension, containing the liquid acting to form the suspension of the solid and the liquid products formed during the conversion, is recovered via a line generally close to the upper level of the suspension in the column.

The solid particles are then separated from the liquid using any means known to the skilled person, for example by filtering. A description of the operation of a slurry bubble column can be found in the Applicant's European patent application EP-A-0 820 806 cited by way of reference, the description of which should hereby be considered to be included by dint of this reference.

Facilities for carrying out the process of the invention also generally comprise separation means for the production of a liquid fraction and possibly also of residual gaseous products or of products formed during conversion, and possibly inert compounds.

The catalysts used in these processes and methods for producing such catalysts are well known to the skilled person. A variety of such catalysts can be used, and usually contain at least one metal selected from metals from groups 5 to 11 of the new periodic table (groups Ib, Vb, VIb, VIIb and VIII of the old periodic table).

The support is generally a porous material and usually a porous inorganic refractory oxide. By way of example, the support can be selected from the group formed by alumina, silica, titanium oxide, zirconia, rare earths or mixtures of at least two of these porous minerals.

The desired products are generally separated substantially completely from the catalyst (for example until the amount of residual catalyst is of the order of 1 to a few parts per million (ppm)), to enable its use or treatment in subsequent steps.

Typically, the quantity of solid particles of catalyst in the slurry represents 10% to 65% by weight of the slurry. These particles usually have a mean diameter in the range about 10 to about 800 microns. Finer particles may be produced by attrition, i.e., fragmentation of the initial catalyst particles.

European patent application EP-A-0 450 861 describes the use of a catalyst based on cobalt dispersed on titanium oxide in a slurry bubble column type reactor. Further, EP-B-0 450 860 describes a method for operating that type of reactor in an optimal manner.

Those two documents indicate that the performance of the catalysts essentially depends on the concentration of gaseous reactant (synthesis gas) in the reactor, i.e., on the partial pressure of carbon monoxide and hydrogen in the reaction zone.

In hydrodynamics terms, those documents then indicate that in a perfectly mixed reactor, such as a fully back-mixed reactor or CSTR, the composition of gaseous reactants and liquid and gaseous products and the concentration of catalyst are the same at any point in the reactor. Thus, those perfectly mixed reactors lead to better selectivity for $C_5^+$ hydrocarbons, but to the detriment of productivity.

In contrast, in a plug flow reactor, the partial concentration of reactant decreases along the entire length of the reaction zone, and that type of reactor results in the highest productivities to the detriment of selectivity.

EP-B-0 450 860 indicates that Peclet numbers for the gas phase of more than 10, also known as "gas Peclet numbers or $Pe_g$", lead to a plug flow type operation regarding the gas phase, while gas Peclet numbers ($Pe_g$) of less than 1 correspond to systems in which the gas phase is perfectly mixed or stirred. Ideal perfectly stirred systems correspond to Peclet numbers tending towards zero. This Peclet number is equal to $Pe_g = H\, u_g/D_{ax}$, where H is the expansion height of the catalytic bed, $u_g$ is the space velocity of the gas and $D_{ax}$ is the axial dispersion coefficient of the gas phase.

The method that can produce an optimal slurry bubble column that is described in EP-B-0 450 860 comprises injecting gas at a mean superficial velocity such that the formation of slug flow is avoided, the gas superficial velocity being 0.2 ($H/D_{ax}$) or more. A further condition applies to the superficial velocity of the liquid and the sedimentation rate of the solid (generally the catalyst) so that the solid is suitably fluidised in the liquid phase.

Those documents do not take thermal effects into account, nor the presence of an undesirable reaction that has a large negative influence on the exothermicity and selectivity of the reaction. Too much exothermicity in the catalyst generally leads to an increase in the formation of methane, a product that is favoured by high temperatures, and a drop in activity, for example by sintering of the active phase (M. E. DRY, "Catalysis Science and Technology", Volume 1, Anderson and Boudart, pages 175 and 198).

SUMMARY OF THE INVENTION

The invention concerns a process for converting hydrocarbons by reaction in the presence of a catalyst, carried out in a three-phase reactor and in which the liquid Peclet number ($Pe_l$) is in the range 0 (excluded) to about 10, preferably in the range from about 0.005 to about 8, more preferably in the range from about 0.01 to about 5 and highly preferably in the range from about 0.02 to about 3 or in the range from about 0.03 to about 1.

This process can control the reaction on a thermal level and encourage formation of the desired products.

DETAILED DESCRIPTION OF THE INVENTION

The invention concerns a process for coverting hydrocarbons in a reaction zone containing a suspension of solid particles in a liquid, which comprises solid particles of catalyst for the reaction. Said suspension is also termed a slurry. The process of the invention is thus carried out in a three-phase reaction. Preferably, the process of the invention is carried out in a slurry bubble column type three-phase reactor.

The Applicant has discovered that it is important to be able to control the hydrodynamics of the liquid if thermal transfers are to be controlled in the reaction zone, as well as the reaction itself.

In the process of the invention, it is the reactant, liquid or dissolved in the liquid phase, that comes into contact with the catalyst in suspension in said phase and which reacts.

Regarding mass transfer it is preferable to establish a flow rate in the reactive phase, and thus the liquid phase that contains dissolved gas, that is as close as possible to plug flow in order to obtain maximum conversion. However, in the case of highly exothermic or highly endothermic reactions, plug flow generates a substantial temperature profile that renders thermal control difficult.

The mixture of reactants entering the reactor undergoes the reaction and this continues as the fluid advances into the column. In this type of reactor function, the concentration and partial pressure of the reactants reduces along the reactor while that of the products (gaseous or liquid) and the water produced by the reaction increases. Plug flow is thus the origin of a concentration gradient associated, in the case of a highly exothermic or highly endothermic reaction, with a substantial temperature gradient along the reactor.

Consider the following reaction scheme, which is well known to the skilled person, for an endothermic reaction:

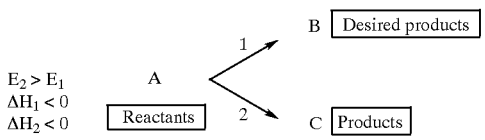

When the parallel reaction, formation of undesirable products C (reaction 2), has an activation energy (E2) which is higher than that (E1) of the main reaction of formation of desirable products B, the rate of formation of methane increases faster with temperature than that of other hydrocarbons. Further, since the two reactions are exothermic (enthalpies ΔH1 and ΔH2 for reactions 1 and 2 are negative), progress of the reaction causes an increase in the heat released by the reaction, which increases the temperature and thus the formation of undesirable products C.

An increase in the temperature gradient along the reactor thus results in a reduction in the selectivity for desired products. A similar reasoning can be made in the case of endothermic reactions where E1>E2 (E1 is the energy of activation of the reaction leading to undesirable products, and E2 is the energy of activation of the reaction leading to undesirable products C). a reduction in the temperature due to the endothermicity of the reaction encourages formation of products C.

The present invention describes a process whereby the formation of desirable products B by reaction 1 is encouraged by controlling the parameters associated with the reaction.

In the case of the reaction scheme described above (reactions 1 and 2), the unsteady state material balance equations can be written as:

Species A:

$$\frac{1}{Pe_l} \cdot \frac{\partial^2 C_A}{\partial Z^2} - \frac{\partial C_A}{\partial Z} - (r_1(C_A) + r_2(C_A)) = \frac{\partial C_A}{\partial t^*}$$

Species B:

$$\frac{1}{Pe_l} \cdot \frac{\partial^2 C_B}{\partial Z^2} - \frac{\partial C_B}{\partial Z} + r_1(C_A) = \frac{\partial C_B}{\partial t^*}$$

Species C:

$$\frac{1}{Pe_l} \cdot \frac{\partial^2 C_C}{\partial Z^2} - \frac{\partial C_C}{\partial Z} + r_2(C_A) = \frac{\partial C_C}{\partial t^*}$$

Similarly, the unsteady state energy balance can be written as:

$$\frac{1}{Pe_T} \cdot \frac{\partial^2 T}{\partial Z^2} - \frac{\partial T}{\partial Z} + (r_1(C_A) \cdot (-\Delta H_1) + r_2(C_A) \cdot (-\Delta H_2)) \cdot \frac{\tau}{\rho \cdot C_p} - \frac{U \cdot a \cdot \tau}{\rho \cdot C_p} \cdot (T - T_{cool}) = \frac{\partial T}{\partial t^*}$$

where $$Pe_l = \frac{u_l \cdot H}{D_{ax}} \qquad Pe_T = \frac{\rho \cdot C_P}{\lambda} \cdot u_l \cdot H$$

-continued $$Z = \frac{z}{H} \qquad \tau = \frac{H}{u_l} \qquad t^* = \frac{t}{\tau} \qquad r_i(C_A) = k_o \cdot e^{\frac{E_i}{R \cdot T}} \cdot C_A^n$$

a = heat exchange surface density
$C_i$ = concentration of species i
$C_p$ = liquid heat-capacity rate
$D_{ax}$ = axial dispersion coefficient
$E_1$ = activation energy of reaction 1
$E_2$ = activation energy of reaction 2
H = expansion height of catalytic bed
$Pe_l$ = liquid Peclet number
$Pe_T$ = thermal Peclet number
$r_1$ = rate of formation of B
$r_2$ = rate of formation of C
t = time
t* = normalised time
$u_l$ = liquid velocity
U = heat transfer coefficient
z = axial position
Z = normalised axial position
$\Delta H_1$ = enthalpy of reaction 1
$\Delta H_2$ = enthalpy of reaction 2
λ = effective thermal conductivity
ρ = density of liquid
τ = liquid passage time Given that the thermal dispersion very closely follows the mass dispersion, equality of the thermal Peclet number and the mass Peclet number for the liquid phase $Pe_l$ constitutes a reasonable hypothesis that is accepted by the skilled person (P. L. MILLS et al., "Three-Phase Sparged Reactors" in Topics in Chemical Engineering, volume 8, chapter 5, p. 364, K. D. P. NIGAM and A. SCHUMPE editors, GORDON and BREACH, publishers). The selectivity for product B and the temperature profile along the column can then be determined by solving the above equations.

Figure 2:
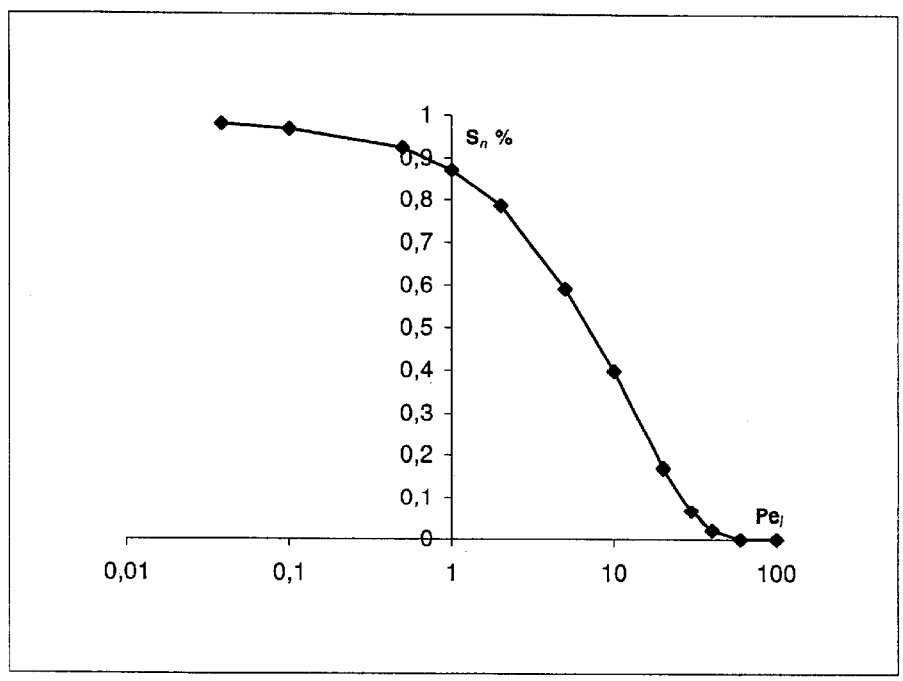

Solution leads to the results shown in FIGS. 1 and 2.

FIG. 1 shows the development of the temperature differential (ΔT), i.e., the increase in temperature due to reactions 1 and 2, as a function of the liquid Peclet number ($Pe_l$). This temperature differential increases substantially for liquid Peclet numbers of more than a few units. For suitable thermal control of the reaction, it is preferable to maintain the temperature differential to less than 15°C., preferably to less than 10°C. It is thus preferble to operate with a liquid Peclet number of less than about 10, preferably about 8. Beyond these values, controlling the exothermicity of the reaction can become difficult or even impossible.

FIG. 2 shows the development of the selectivity ($S_n$) for desired products as a function of the liquid Peclet number ($Pe_l$). Thus, it appears from the figure that selectivity decreases more significantly when the liquid Peclet number exceeds a few units.

During the conversion reaction, the selectivity for desirable products B ($C_2$+hydrocarbons) reduces when the temperature differential in the reactor increases, and the liquid Peclet number $Pe_l$ appears to be a reaction control parameter.

Further, the liquid phase Peclet number should not be zero in order to distinguish it from a perfectly stirred reactor in which conversion is minimal.

The lower limit for the Peclet number depends on the activity of the catalyst in a perfectly stirred reactor in which conversion is minimal.

The lower limit for the Peclet number depends on the activity of the catalyst in a perfectly stirred reactor, thus inter alia on its composition and/or its preparation method. When the Peclet number increases, conversion also increases. However, it is preferable for the Peclet number not to be too high in order to avoid a temperature profile that renders thermal control difficult and leads to too low a selectivity for the desired product as shown in FIGS. 1 and 2.

As a result, a high selectivity for desired products (i.e., a selectivity of more than 50%, preferably more than 60% by weight, more preferably more than 70% by weight) and sufficient conversion (i.e., a conversion of more than 40%, preferably more than 50%, more preferably more than 70%) corresponds to a high productivity in desired products and will be obtained when the liquid peclet number $Pe_l$ is non zero and is as high as possible, while remaining below an upper limit beyond which thermal control becomes difficult and/or selectivity for desired products becomes too low.

In the process of the invention, the Peclet number $Pe_l$ is thus in the range 0 (excluded) to about 10, preferably in the range from about 0.005 to about 8, more preferably in the range from about 0.01 to about 5 and still more preferably in the range from about 0.02 to about 3, or even in the range from about 0.03 to about 1.

When the liquid Peclet number is in the range cited above, a hydrocarbon conversion process is produced with performances that are optimised as regards conversion and selectivity in the desired products, and better control of the heat released by the reaction, which can also avoid too great a deactivation of the catalyst in the case of exothermic reactions.

It may also be advantageous and preferable to operate with a superficial gas velocity that can avoid the formation of pockets of gas (slugs). However, this phenomenon is really only important when the reactor diameter is small, i.e., the diameter is less than 6 metres (6 m), or even less than 2 metres (2 m).

Further the process in the invention is preferably carried out with a superficial gas velocity $U_g$ of less than 35 cm.s$^{-1}$, to encourage gas transfer into the liquid phase and thus to encourage the reaction, but also to avoid too much attrition of the catalyst grains.

Figure 3:
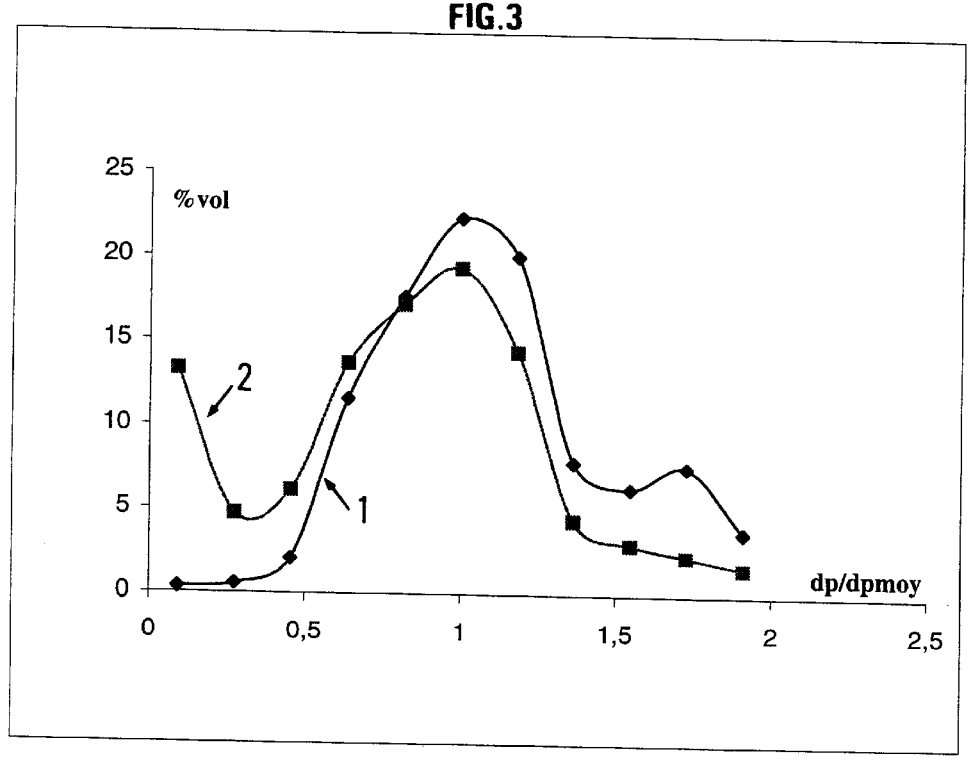
Figure 4:
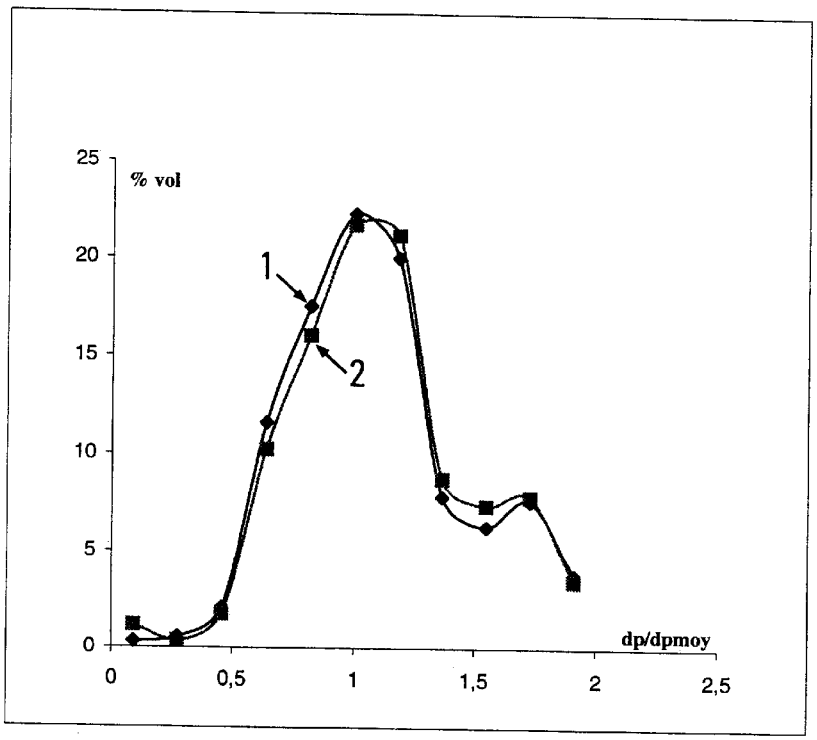

FIGS. 3 and 4 represent the particle size distribution of a hydrotreatment catalyst based on cobalt and molybdenum dispersed on alumina before the reaction (curves 1) and after 10 days of test in a three-phase reactor (curves 2). This distribution is visualised in terms of the volume % of particles for different values of the ratio $d_p/d_{pmean}$ (the ratio between the catalyst particle diameter and the mean diameter of the particle ensemble). FIG. 3 was obtained for a superficial gas velocity $U_g$ of 40 cm/s, and FIG. 4 for $U_g$=30 cm/s. Substantial formation of fine particles with a $d_p/d_{pmean}$ of less than 0.5 is obtained when $U_g$ is 40 cm/s (FIG. 3), which is not the case when $U_g$=30 cm/s (FIG. 4).

The hydrocarbon conversion process of the invention can be carried out in any type of three-phase reactor, preferably in a slurry bubble column or in a slurry bubble column type reactor. It appears to be advantageous to operate in reactors of sufficient size, in particular to obtain sufficiently high hourly production rates (weight of desired products formed in one hour). It appears to be preferable to use one or more reactors with a diameter of more than about 2 metres, more preferably more than 6 metres, or even more than 7 metres in the process of the invention.

In order to verify the operating conditions of the process of the invention, in particular the hydrodynamic conditions and the value of the Peclet numbers, it is advantageous to carry out experimental measurements during operation, and also to carry out tests using tracers. Such techniques are known to the skilled person and have been described, for example, in EP-B-0 450 860.

Any type of catalyst that is known to the skilled person can be used in the process of the invention. In general, the catalysts used in the process of the invention contain at least one metal selected from metals from groups 5 to 11 of the new periodic table (groups Ib, Vb, VIb, VIIb and VIII of the old periodic table).

The catalyst can contain at least one activation agent (also termed a promoter) selected from elements from groups 1 to 7 of the new periodic table (groups Ia, IIa and IIIb to VIIb of the old periodic table). These promoters can be used alone or in combination.

The catalyst can optionally be dispersed on a support, the support then preferably comprising a refractory inorganic oxide selected from the group formed by aluminas, silica, titanium oxide, zirconia and rare earths.

The operating conditions for the hydrocarbon conversion reaction are generally well known. The reactor of the invention generally operates optimally at a temperature in the range 160°C. to 450°C., preferably in the range 200°C. to 420°C., at a pressure in the range 0.1 to 20 MPa, preferably in the range 0.5 to 10 MPa, more preferably in the range 1 to 8 MPa.

What is claimed is:

1. A process comprising converting hydrocarbons in the presence of a catalyst, carried out in a three-phase reactor with a diameter of more than 2 metres and in which the liquid Peclet number ($Pe_1$) is in the range of above 0 to about 10.

2. A process according to claim 1, in which the superficial gas velocity, $U_g$, is less than about 35 cm.s$^{-1}$.

3. A process according to claim 1, in which $Pe_1$ is in the range about 0.005 to about 8.

4. A process according to claim 1, in which the catalyst contains at least one metal selected from the group consisting of metals from groups 5 to 11 of the new periodic table.

5. A process according to claim 4, in which the catalyst contains at least one activation agent selected from the group consisting of elements from groups 1 to 7 of the new periodic table.

6. A process according to claim 4, in which the metal is dispersed on a support.

7. A process according to claim 6, in which the support comprises at least one oxide selected from the group consisting of: aluminas, silica, titanium oxide, zirconia and rare earths.

8. A process according to claim 1, in which the temperature is in the range 160°C. to 450°C., and the pressure is in the range 0.1 to 20 MPa.

9. A process according to claim 1, in which the three-phase reactor is a slurry bubble column.

10. A process according to claim 2, in which $Pe_1$ is in the range about 0.005 to about 8.

11. A process according to claim 10, in which the catalyst contains at least one metal selected from the group consisting of metals from groups 5 to 11 of the new periodic table.

12. A process according to claim 11, in which the catalyst contains at least one activation agent selected from the group consisting of elements from groups 1 to 7 of the new periodic table.

13. A process according to claim 2, in which the three-phase reactor is a slurry bubble column.

14. A process according to claim 3, in which the three-phase reactor is a slurry bubble column.

15. A process according to claim 4, in which the three-phase reactor is a slurry bubble column.

* * * * *